Sept. 7, 1943. H. M. AUSTIN 2,329,028
OIL SEAL
Filed Jan. 11, 1941
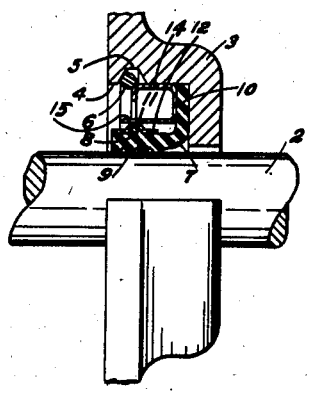
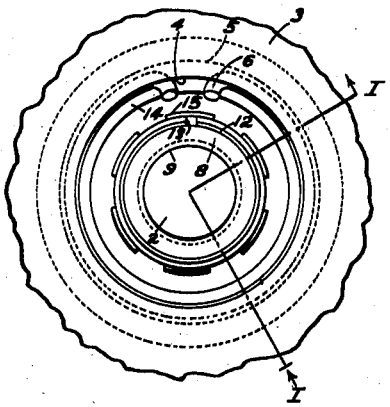
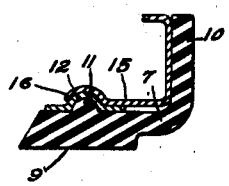
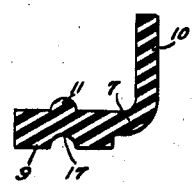
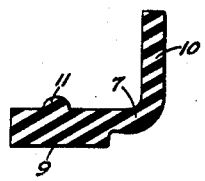
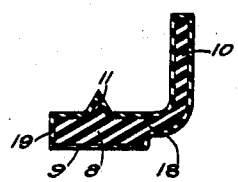
Inventor
Harry M. Austin
by
Walter F. Kaufman
Attorney Patented Sept. 7, 1943

2,329,028

UNITED STATES PATENT OFFICE 2,329,028

OIL SEAL

Harry M. Austin, East Petersburg, Pa., assignor to Armstrong Cork Company, Lancaster, Pa., a corporation of Pennsylvania Application January 11, 1941, Serial No. 374,063

8 Claims. (Cl. 286—5)

This invention relates to an oil seal for rotating and reciprocating shafts.

Heretofore, sealing means to prevent escape of oil along a journal, shaft, or axle has generally employed some resilient means for pressing the packing material against the rotating member. However, such means as have been employed for pressing said seal against the rotatable member have failed to exert uniform pressure about the periphery of the rotatable member and have failed to present a surface of uniform pressure along a substantial length of the rotatory member along its axis. While such seals are adequate for simple rotation, they are generally inadequate for sealing the reciprocatory elements.

It is an object of the invention to provide a simple seal consisting of relatively few parts which are easy to assemble and which cooperate to impart to the sealing device a sealing area of uniform pressure of large extent both circumferentially and axially of the rotatory or reciprocatory or both rotatory and reciprocatory member to be sealed.

In the drawing, illustrative of the invention,

Figure 1 shows a cross-sectional elevation of the sealing device;

Figure 2 shows an elevation looking from the left side of the device as shown in Figure 1;

Figures 3 to 6 inclusive show modified forms of the packing element of the sealing device.

In Figures 1 and 2, a rotatory and/or reciprocatory member 2 is shown within the seal housing 3 which may constitute a stationary element of any machine. The housing 3 is provided with a bore 4 of larger diameter than the reciprocatory or rotatory member 2 to be sealed to accommodate the several elements of the sealing means. This bore is also provided with an annular groove 5 to accommodate the spring assembly ring 6 shown.

The packing element 7 comprises an axially-extending portion 8 having a surface 9 functioning as a seal and the radially extending portion 10 adapted to fit within the bore 4 in the housing 3 to position the seal relative thereto. The axially-extending portion 8 of the packing element 7 is provided with an annular rib 11 positioned on the outer surface of this portion centrally with respect to the area of the surface 9 which actually serves as the sealing surface. A clamping ring 12, preferably made of spring steel, split at 13 and having a shape to conform with the outside periphery of the axially-extending portion 8 of the packing element 7, is made of such size as to exert a radially inwardly directed pressure upon the packing element 7. To hold the axially-extending portion of the packing element in place relative to the housing 3 and also to exert additional pressure upon the clamping ring, the device is provided with an annular hollow element 14 having generally the shape of a hollow square in cross-section, and having spring fingers 15 spaced uniformly about the internal periphery thereof. As shown in Figures 1 and 2, this annular hollow element 14 is held in place against the radially extending portion 10 of the packing element by means of the assembly ring 6 which is sprung into place in the annular groove 4 within the housing 3. The pressure exerted upon the spring clamping ring 12 by the spring fingers 15 is distributed uniformly by virtue of the fact that the clamping ring makes a uniform contact substantially completely around the axially-extending portion 8 of the packing element. The device is preferably arranged so that one of the spring fingers 15 overlaps the split 13 in the clamping ring 12 to compensate for any lack of uniformity and pressure at this point. The positioning of the annular projecting rib 11 centrally of the sealing area 9 of the packing element 7 assures uniformity of pressure axially of the sealing element. The clamping ring 12 serves to distribute the pressure uniformly not only axially of the sealing element but also radially. If desired, the ends 16 of the spring fingers 15 may be shaped to conform more or less with the external contour of the clamping ring 12 as shown in Figure 3. In such case, the engagement of the spring fingers 15 with the clamping ring 12 serves to prevent axial displacement or flexing of the packing element 7 relative to the housing 3 during reciprocating movements of the member 2.

In Figures 3 to 6 there are disclosed several different forms of packing elements. Obviously, the bearing surface of the packing element, may be varied, such as in Figure 4, to provide but one break 17 annularly of such surface 9, or such as in Figures 3, 5, and 6 to provide an unbroken bearing surface. Similarly, the annular projecting rib 11 may have any desired form, such as the triangular cross-sectional shape of Figure 6. Figure 6 also shows a modification on the packing element 7 in which the main body 18 of the material may be of ordinary rubber and is surrounded by a sheath 18 cemented or vulcanized thereto and comprising an oil-resistant synthetic rubber or rubber substitute having oil-resistant properties. In the other modifications of the packing element in the drawing, the packing element 7 comprises an oil-resistant material such as Neoprene, Thiokol, or any other form of synthetic rubber which is oil-resistant.

It is obvious that various modifications in the above description may be made without the exercise of more than the skill of the average mechanic, and therefore the invention is to be construed as limited only by the appended claims.

I claim:

1. Sealing means for journals comprising a sealing element having a relatively extensive sealing surface axially of the journal to be sealed, an annular resilient member having an internal bearing surface engaging the external peripheral surface of the axially-extending portion of said sealing element, said resilient member having an annular rib projecting outwardly from said member centrally with respect to the sealing surface thereof, and means for exerting radially inwardly directed pressure on said rib.

2. Sealing means for journals comprising a packing element having a relatively extensive sealing surface axially of the journal to be sealed, an annular resilient member having an internal bearing surface engaging and exerting radially inwardly directed pressure upon the external peripheral surface of the axially extending portion of said packing element, said resilient member having an annular rib projecting outwardly from said member located symmetrically with respect to the sealing surface thereof, and means for exerting radially inwardly directed pressure around said rib.

3. In combination, a journal, a housing around said journal for an oil-sealing device, said device comprising a packing element having a relatively extensive sealing surface axially of said journal and having a radially-extending portion, a split resilient ring exerting a radially inwardly directed pressure upon the axially-extending portion of said packing element, said ring having an annular corrugation projecting outwardly from the central portion thereof, and annular means holding the radially-extending portion of said packing element in position in said housing and exerting radially inwardly directed pressure around the corrugation of said ring.

4. In combination, a journal, a housing around said journal for an oil-sealing device, said device comprising a packing element having a relatively extensive sealing surface axially of said journal, an annular rib projecting outwardly from the external periphery of said axially-extending portion symmetrically with respect to said sealing surface, and a radially-extending portion, a split resilient ring exerting a radially inwardly directed pressure upon the axially-extending portion of said packing element, said ring having an annular corrugation projecting outwardly from the central portion thereof, in conformity with said rib, and annular means holding the radially-extending portion of said packing element in position in said housing and exerting radially inwardly directed pressure around the corrugation of said ring.

5. In combination, a journal, a housing around said journal for an oil-sealing device, said device comprising a packing element having a relatively extensive sealing surface axially of said journal and having a radially-extending portion, a split resilient ring exerting a radially inwardly directed pressure upon the axially-extending portion of said packing element, said ring presenting a bearing area against said packing element substantially as large as and substantially in line with the sealing surface of said packing element and said ring having an annular corrugation projecting outwardly from the central portion thereof, and an annular member holding the radially extending portion of said packing element in position in said housing and exerting radially inwardly directed pressure around the corrugation of said ring.

6. In journal sealing means, the combination of a sealing element having a relatively extensive sealing surface extending axially of such journal and having an annular rib projecting outwardly from the external peripheral surface of said axially-extending portion symmetrical with respect to said sealing surface; and a split annular member substantially surrounding the axially-extending portion of said sealing element and having an annular corrugation projecting outwardly from the central portion thereof and in conformity with such rib, said corrugation forming a recess adapted for receiving said rib.

7. Sealing means for journals comprising a packing element having a relatively extensive sealing surface axially of the journal to be sealed and a surface extending radially of said journal; a split spring clamping member adapted to exert radially inwardly directed pressure upon the axially extending surface of said sealing element, and having an annular rib projecting outwardly therefrom centrally with respect to the sealing surface thereof; and an annular element engaging the radially extending surface of said packing element and having spring members uniformly spaced about the internal periphery thereof engaging the outer periphery of said split member and exerting radially inwardly directed pressure around said rib.

8. In combination, a journal, a housing around said journal for an oil sealing device, said device comprising a packing element having a relatively extensive sealing surface axially of the journal to be sealed and a surface extending radially of said journal; a split spring clamping ring adapted to exert radially inwardly directed pressure upon the axially extending sealing surface of said packing element, and having an annular corrugation projecting outwardly from the central portion thereof; an annular element engaging the radially extending surface of said packing element and having spring members uniformly spaced about the internal periphery thereof engaging the outer periphery of said split ring and exerting radially inwardly directed pressure around said corrugation; and a member adapted to hold said annular element in compression in both radially inwardly and axially extending directions relative to said journal.

HARRY M. AUSTIN.